(12) United States Patent
Kuroda et al.

(10) Patent No.: US 7,808,953 B2
(45) Date of Patent: Oct. 5, 2010

(54) COMMUNICATION CONTROL METHOD, WIRELESS COMMUNICATION SYSTEM, MOBILE STATION, BASE STATION AND BASE STATION CONTROL UNIT

(75) Inventors: Nahoko Kuroda, Tokyo (JP); Koujirou Hamabe, Tokyo (JP); Jinsock Lee, Tokyo (JP)

(73) Assignee: NEC Corporation, Tokyo (JP)

( * ) Notice: Subject to any disclaimer, the term of this patent is extended or adjusted under 35 U.S.C. 154(b) by 1255 days.

(21) Appl. No.: 11/324,331

(22) Filed: Jan. 4, 2006

(65) Prior Publication Data

US 2006/0146762 A1 Jul. 6, 2006

(30) Foreign Application Priority Data

Jan. 5, 2005 (JP) .............................. 2005-000912

(51) Int. Cl.
*H04B 7/216* (2006.01)
(52) U.S. Cl. ....................... 370/335; 370/256
(58) Field of Classification Search ................. 370/235, 370/329, 335, 331, 441, 345, 278, 282, 328, 370/256; 455/7, 13.4
See application file for complete search history.

(56) References Cited

U.S. PATENT DOCUMENTS

| 7,409,216 | B2 * | 8/2008 | Moon et al. ................. 455/437 |
| 2003/0108027 | A1 * | 6/2003 | Kim et al. .................... 370/345 |
| 2005/0094561 | A1 * | 5/2005 | Raaf ........................... 370/235 |
| 2006/0087980 | A1 * | 4/2006 | Ikeda et al. ................. 370/252 |

FOREIGN PATENT DOCUMENTS

JP 2004-304411 A 10/2004
WO 03/069852 A1 8/2003

OTHER PUBLICATIONS

3 GPPTS25.214V6.3.0, $3^{rd}$ Generation Partnership Project; Technical Specification Group Radio Access Network; Physical Layer Network (FDD), Sep. 2004.
3 GPPRAN WG1 38bis Meeting R1-041178, "E-DCH and Compressed Mode," Ericsson, Sep. 20-24, 2004.
3 GPPRAN WG1 Release 6 Ad Hoc Meeting R1-040770, "Interaction Between Enhanced Uplink and Compressed Mode," Philips, Jun. 21-24, 2004.

* cited by examiner

*Primary Examiner*—George Eng
*Assistant Examiner*—Khawar Iqbal
(74) *Attorney, Agent, or Firm*—Sughrue Mion, PLLC

(57) ABSTRACT

A wireless communication, in which mobile and base stations setup uplink and downlink channels, and the mobile station transmits data flows. The base station interrupts transmission via the downlink setup with the mobile station in the predetermined transmission interruption time interval. The mobile station determines, in response to the data flow, packet transmission in a first transmission time interval for the predetermined time interval determined from the transmission interruption time interval or re-transmission of the packets transmitted in the first transmission time interval. The mobile station transmits packets in response to the determination. The base station transmits an arrival confirmation signal for the transmitted packets. The mobile station performs re-transmission in response to the arrival confirmation signal or to the determination.

13 Claims, 11 Drawing Sheets

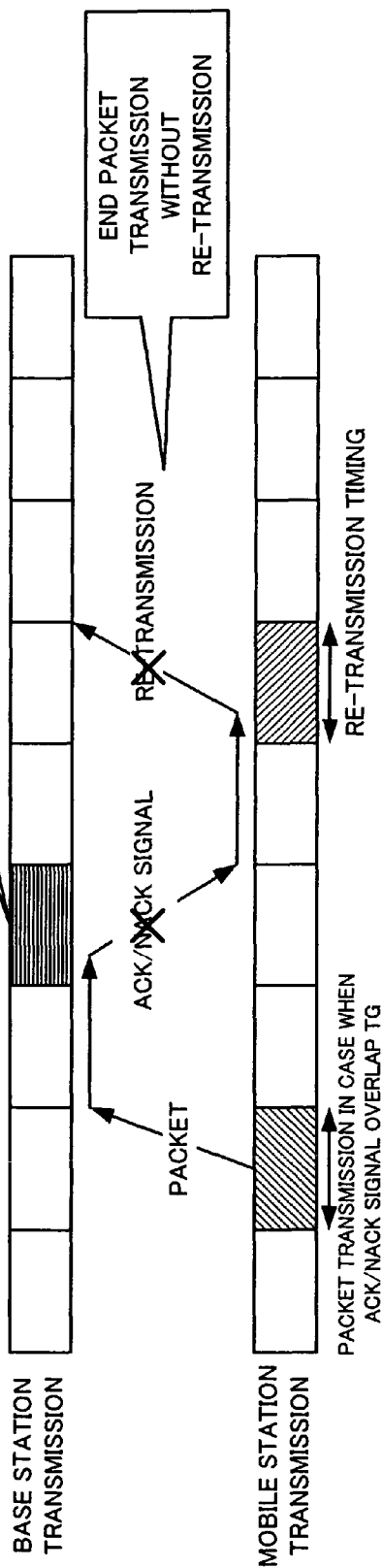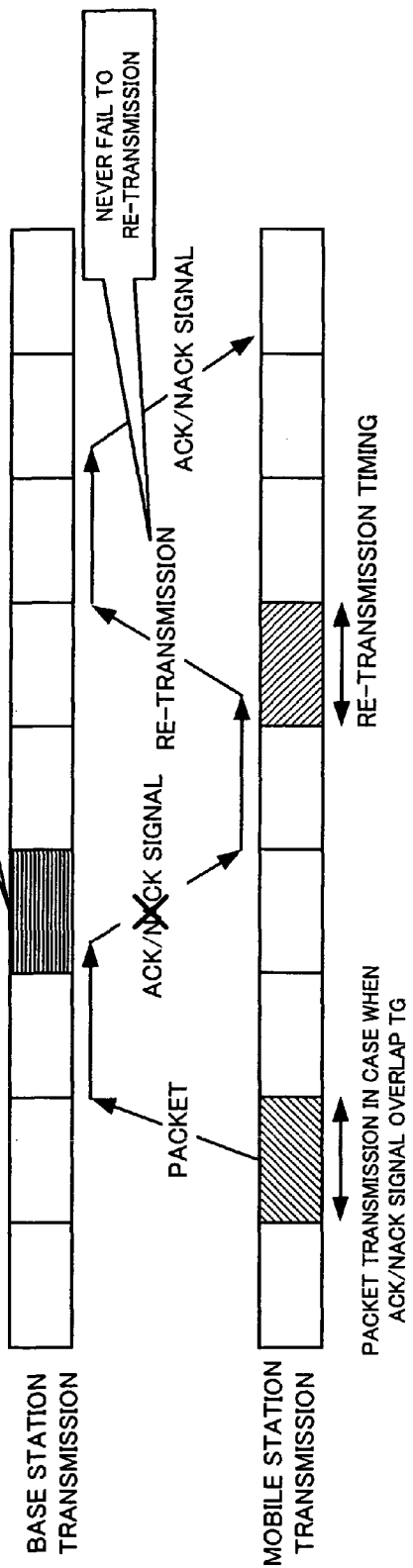

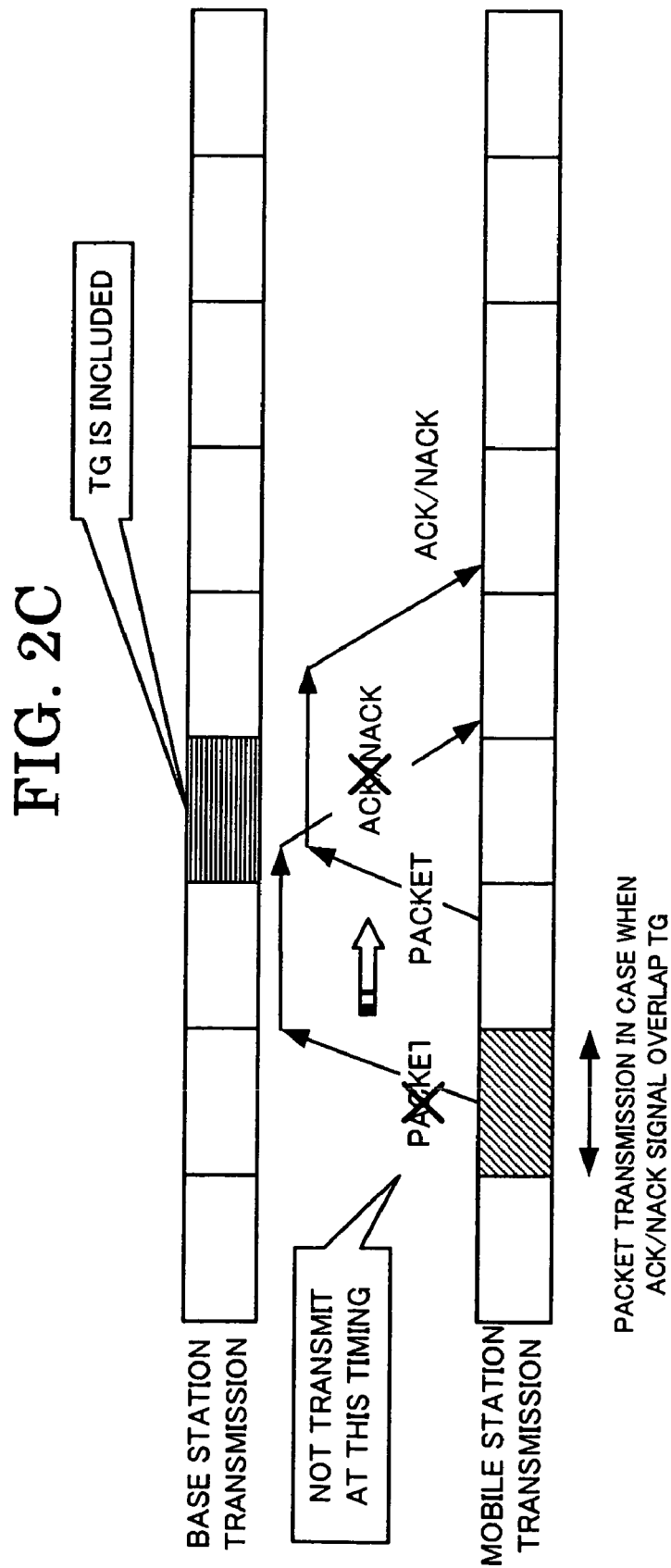

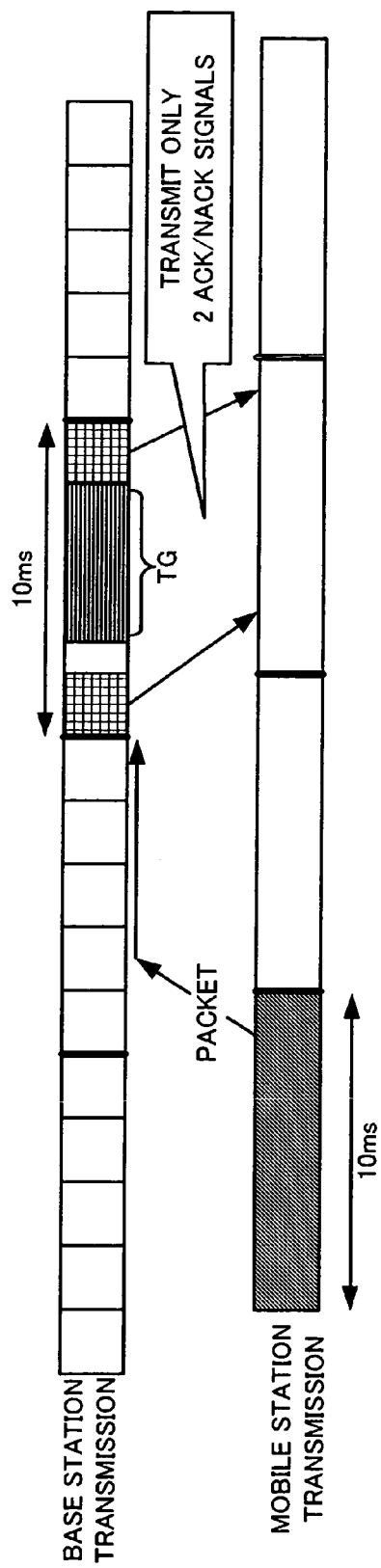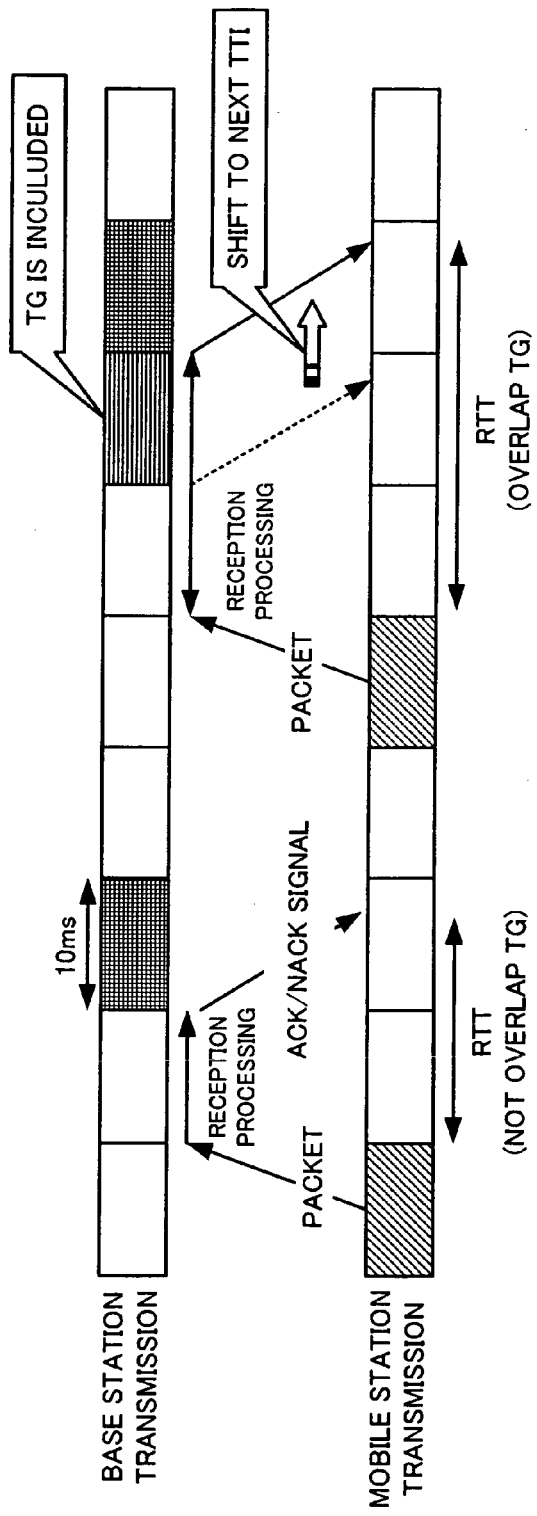
FIG.10A
FIG.10B

COMMUNICATION CONTROL METHOD, WIRELESS COMMUNICATION SYSTEM, MOBILE STATION, BASE STATION AND BASE STATION CONTROL UNIT

BACKGROUND OF THE INVENTION

This invention relates to a communication control system, a radio communication system, a mobile station, a base station and a base station control unit, and particularly to a packet transfer system utilizing re-transmission control.

In a WCDMA cellular system, a base station can use a plurality of different frequency bands, and a mobile station is capable of using a hand-over between different frequencies. Also, sometimes, hand-over to a different type of cellular system such as a GSM may be made. For this reason, each mobile station requires time for reception quality measurement, synchronization establishment, etc. of the hand-over destination frequency and by frequency switching. To permit this, a compressed mode (CM) is set in a WCDMA. In the CM, transmission and reception of some transmitted frames via a link being in communication are interrupted to provide a transmission gap permitting the mobile station to measure the different frequency band. The data during the transmission gap is transmitted as compressed data at an increased transfer rate before and after the interruption. The base station control unit sets up the following parameters as shown in FIG. 8, and informs the setup parameters to the base and mobile stations. The base and mobile stations are set in the CM according to these parameters:

Transmission Gap (TG)
Transmission Gap Length (TGL)
Transmission Gap Distance (TGD)
Transmission Gap Pattern Length (TGPL) and
Transmission Gap Pattern Repetition Counter (TGPRC)

The TG can be set for the uplink only, the downlink only or both the uplink and downlink.

In packet transfer in the WCDMA system, error detection is made in a radio unit controller in the base station control unit. The operation of error detection is executed in one of two modes, i.e., an acknowledged mode (AM) and an unacknowledged mode (UM). In the AM mode, when the radio link controller detects any error, it transmits a control signal for requesting re-transmission to the mobile station. In the UM, when the radio link controller detects any error, it discards the pertinent data block, and does not request any re-transmission. The setting of either the AM or the UM can be made for each data flow. The AM is set in case of application with a very low request error factor, for instance, a file transfer. The UM is set in case of an application that requires a real time property, for instance, a VoIP.

Usually, the error factor in the RLC must be controlled to be very small because, in case of the AM in which re-transmission is made, although a block error can be avoided, the connection of a plurality of base stations to the base station control unit leads to very long control delay. Therefore, re-transmission delay is long, resulting in a very long packet transmission delay. For example, in case of the file transfer, the file transfer time is increased. In case of the UM, since any error detected data is discarded, data loss is increased at the application level. For example, in case of the VoIP, the voice quality is greatly deteriorated.

Although the error factor in the radio layer can be reduced by increasing the transmission power per bit, a large power is required in order to always maintain a low error rate because the radio propagation environment tends to largely change due to fading or the like. This leads to increase of interference components and consumption of power resources, thus reducing the system capacity. Accordingly, in case of an HSDPA (High Speed Downlink Packet Access) or an EUDCH (Enhanced Uplink Dedicated Channel), which is a high rate transfer system in the WCDMA, the base station executes an HARQ (Hybrid Automatic Re-transmission Control) to largely reduce the error factor in the radio layer. The HARQ is a method in which a check is made to determine if there is any data block reception error. If there is any reception error, the same data block is re-transmitted. On the receiving side, the first transmitted and re-transmitted data blocks are combined to increase the probability of obtaining a correct data block. This method will be described in greater details by taking the EUDCH, i.e., Uplink High Speed Packet Transfer, as an example. The base station checks if a data block is received without any error. If the base station detects any error, it transmits a NACK signal according to a downlink control signal. If the base station does not detect any error, it transmits an ACK signal. If the mobile station receives the NACK signal, it re-transmits the same data block at the predetermined re-transmission timing. If the mobile station receives the ACK signal, it transmits a new data block at the predetermined transmission timing. If the base station transmits the NACK signal, it holds the error detection data block in a buffer, and combines the data re-transmitted from the mobile station with the held data. The base and mobile stations execute data block re-transmission until data block is correctly received or the re-transmission reaches the predetermined maximum number.

With the HARQ introduced into the base station, it is possible to effect the re-transmission at a higher rate than in the case of re-transmission in the RLC, thus reducing the data transmission delay in the AM and improving the data reaching factor of the UM data.

However, as described hereinbefore, in the WCDMA the TG may sometimes be set in the CM. FIG. 9 shows a case, in which a mobile station, while in the EUDCH, starts to be set in the CM. In the EUDCH, the time interval T_BS from the instant when the base station receives a packet to the instant when the base station transmits an error detection result (ACK/NACK signal), is fixed. Therefore, concerning a packet having been received time T_BS before the TG, the base station cannot transmit the ACK/NACK signal. If the mobile station could not receive the ACK/NACK signal after the predetermined time, it decides that the base station could not detect any packet signal. Actually, even if, for instance, the base station could not receive correctly, the mobile station always executes packet re-transmission. Therefore, the wasteful packet transmission poses such problems as reduction of uplink use efficiency and increase of packet transmission delay.

Accordingly, in the present HSDPA it is prescribed that in case when the ACK/NACK signal transmission timing overlaps the TG, the base station does not transmit any ACK/NACK signal. The mobile station is thus scheduled that it does not transmit any packet at such timing (Literature 1: 3 GPPTS25.214V6.3.0 (2004-09) 3rd Generation Partnership Project; Technical Specification Group Radio Access Network; Physical Layer Network (FDD)).

Literature 2 (3 GPPRAN WG1 38bis Meeting R1-041178 "E-DCH and Compressed Mode" (Ericsson)) proposes that in the EUDCH, the mobile station transmits packets even at such timings that the ACK/NACK signal frames overlap the TG, and that the base station transmits only some of the ACK/NACK signals not overlapping the TG. As shown in FIG. 10(a), the radio channel is arranged such that one transmission time interval (TTI) is divided into five sub-frames and that the base station is adapted to repeatedly transmit five ACK/NACK signals in sub-frame units. In the TTI having overlap over the TG, the base station transmits ACK/NACK signals only in sub-frames free from over lap over the TG. Thus, packet transmission is realized regardless of presence or absence of the TG. Literature 3 (3 GPPRAN WG1 Release 6 Ad Hoc Meeting R1-040770 "Interaction between Enhanced Uplink and Compressed Mode" (Philips)) proposes, as shown in FIG. 10(b), that in case of the ACK/NACK signal overlapping over the TG in the EUDCH, the base station transmits the ACK/NACK signal in the next TTI. Like the case of Literature 2, packet transmission is realized regardless of presence or absence of the TG.

The above prior art techniques, however, have the following problems. In the method according to the Literature 1, despite the packet transmission, a time interval incapable of transmitting packets arises at the time of the ACK/NACK signal overlapping over the TG. This poses a problem of thorough-put reduction. Also, in case of such data flow as the VoIP which uses the UM and attaches importance to the real time property, there is a time interval when a data block can not be transmitted as soon as it is generated. Therefore, such problems as increase of delay time swaying and service quality deterioration are posed. In this method, it is possible to use a transmission time interval of 10 ms in addition to 2 ms. Accordingly, when setting as in the case of the HSDPA is applied to the EUDCH, the time interval incapable of transmission is increased to increase the adverse effect of service quality deterioration. In case of the transmission time interval of 2 ms, since the TG can be set to about 10 ms at the most, a case may arise that no packet can be transmitted in about 10 ms.

According to the Literatures 2 and 3, it is possible to solve the problem that a data block cannot be transmitted as soon as it is generated as in the Literature 1. However, the following problems are still posed. According to the Literature 2, since only some of the ACK/NACK signals by holding the transmission power of the base station constant, the ANK/NACK error factor is increased. The increased ACK/NACK signal error factor increases wasteful re-transmission packets (error of ACK→NACK). Therefore, the transmission of new packets is interfered with, and the thorough-put is deteriorated. Also, in the HARQ, re-transmission fails to execute correctly (error of NACK→ACK). Therefore, re-transmission occurs in the RLC, and the packet transmission delay is extremely increased. Furthermore, in order to maintain the ACK/NACK signal error factor to be substantially the same as in the case without overlap over the TG, the transmission power of the base station must be increased.

According to the Literature 3, since the ACK/NACK signals in the case of overlapping over the TG are transmitted in the next TTI, there causes a problem to increase the packet transmission cycle. In order to solve this problem, it is necessary to change the timing of the ACK/NACK signal transmission and reception in the base and mobile stations depending on the result of detection of overlapping over the TG is detected. Therefore, the operation in each station is complicated. Also, since the ACK/NACK signal is shifted to the next TTI, it is impossible to transmit the ACK/NACK signal concerning the packet, in which the ACK/NACK signal is to be transmitted in the pertinent TTI. Consequently, a time interval incapable of transmitting packet arises, thus posing the same problems as in case of the Literature 1, i.e., increase of delay swaying and deterioration of service quality.

SUMMARY OF THE INVENTION

It is an object of the present invention to solve the above problems, and to reduce the delay swaying in services of severe service swaying requirement, while reducing delay occurring due to re-transmission from the base station control unit, thus improving the quality of real time services and increasing the system thorough-put.

In order to solve the above problems, the communication control method, the wireless communication system, the mobile station, the base station and the base station control unit according to the present invention comprise the following characteristic constructions:

(1) In a wireless communication system, in which mobile and base stations setup uplink and downlink channels, the mobile station transmitting a data flow setup in one of a plurality of transmission modes, a communication control method, comprising the steps of:

interrupting the transmission by the base station via the downlink setup with the mobile station for a predetermined transmission interruption time;

determining the packet transmission by the mobile station in a first transmission time interval at a time earlier by the predetermined time to be determined by the transmission interruption time according to the transmission mode of the data flow;

transmitting the packet by the mobile station;

transmitting by the base station an arrival confirmation signal corresponding to the received packet at the predetermined time; and performing a re-transmission by the mobile station in response to the arrival confirmation signal.

(2) A communication control method of the above (1), further comprising the steps of:

transmitting the packet in the first transmission time by the mobile station if the transmission mode of the data flow is an interrupt mode; and interrupting the packet transmission by the base station in the first transmission time if the transmission mode for the data flow is a skip mode.

(3) A communication control method of the above (1), further comprising the steps of:

terminating the packet transmission by the mobile station after transmitting the packet in the first transmission time if the transmission mode for the data flow is the interrupt mode; and performing re-transmission of the packet at a re-transmission time after the predetermined time from the first transmission time subsequent to the transmission of the packet at the first transmission time by the mobile station if the transmission mode for the data flow is a repeat mode.

(4) A communication method of the above (2) or (3), further comprising a step of:

determining the transmission mode and notifying it to the mobile station by the base station or a base station control unit to which the base station is connected.

(5) A communication control method of the above (4), wherein the communication mode is determined in response to the required quality of the data flow.

(6) A communication control method of the above (5), wherein the interrupt mode is determined for any data flow having a value lower than the predetermined threshold value in the required delay or delay swaying.

(7) A communication control method of the above (5) or (6), wherein the repeat mode or the skip mode is determined for any data flow having a value lower than the predetermined value in the error rate requirement.

(8) In a wireless communication system in which packet arrival confirmation can be selectively made for each data flow by a base station control unit, a communication control method of the above (4), wherein a data flow for performing re-transmission in the base station control unit is determined to be in the repeat mode or the skip mode.

(9) A communication control method of the above (4), wherein the mobile terminal determines the transmission mode for a data flow in transmission according to the ratio of the transmission interruption time to the predetermined time interval in the mobile station.

(10) A communication control method of the above (9), wherein the transmission mode is determined to be the interrupt mode if the ratio of the transmission interruption time to the predetermined time interval is greater than the predetermined value.

(11) A communication control method of either one of the above (2) to (10), wherein in the case in which the mobile station transmits an interrupt mode data flow in the first transmission time interval, such a power level is set that the power level per bit is higher than in the case of transmission in different transmission time intervals.

(12) A communication control method of the above (1), which is applied to a wireless communication system capable of setting, as the transmission mode, a transmission rate guarantee mode with uplink resources preferentially assigned by the base station or a base station control unit connected thereto, and further comprising the steps of:

transmitting packets in the first transmission time interval by the mobile station in case of data flow in the transmission rate guarantee mode; and interrupting the packet transmission by the mobile station in case of any data flow other than the transmission rate guarantee mode.

(13) A communication control method of the above (1), which is applied to a radio communication system capable of setting up a data flow (i.e., transmission rate guarantee data) with uplink resources preferentially assigned by said base station or a base station control unit connected thereto and a data flow with resources assigned among the remaining uplink resources by said base station, and further comprising the steps of:

terminating the packet transmission by the mobile station after transmitting the packet in the first transmission interval in case of the transmission rate guarantee data, and performing re-transmission of the packet by the mobile station in the re-transmission time after the predetermined time from the first transmission time interval subsequent to the transmission of the packet in the first transmission time interval in case of the transmission rate guarantee data.

(14) A communication control method of the above (12) or (13), wherein in the case when the mobile station transmits a data flow in the transmission rate guarantee mode in the first transmission time interval, the mobile station performs transmission at such a power level that the power level per bit is higher than in the case of transmission in other transmission time intervals.

(15) A communication control method of either one of above (1) to (14), wherein the first transmission time interval is a packet transmission time interval, in which the transmission time of arrival confirmation signal transmission from the base station partly or fully overlaps the transmission interruption time interval.

(16) In a radio communication system, in which mobile and base stations setup uplink and downlink wireless channels, the mobile station transmitting data flows, a communication control method comprising. the steps of:

instructing to start or stop a compressed transmission method by a base station or a base station control unit connected to the base station;

interrupting transmission in the downlink to the base station in the predetermined transmission interruption time interval upon starting the compressed transmission method by the base station;

performing transmission of a reception confirmation signal for the packet transmitted to the mobile station by the base station after the predetermined time;

performing re-transmission by the mobile station in response to the reception confirmation signal;

terminating the re-transmission of the packet in response to the maximum number of re-transmission times as notified to the base station or the base station control unit by the mobile station; and modifying the maximum number of re-transmission times in response to the start or stop of the compressed transmission method by the base station or the base station control unit.

(17) A communication control method of to the above (16), wherein when the delay requirement or the delay swaying requirement of the data flow is less than the predetermined value, the number of the maximum re-transmission times is set to zero in response to the start of the compression transmission method.

(18) A communication control method of the above (17), wherein in the case of transmitting a data flow, in which the number of the maximum re-transmission times is set to zero, the mobile station transmits the data flow at a power level, at which the power level per bit is higher than in the case of setting the number of the maximum re-transmission times to other than zero.

(19) A wireless communication system, in which mobile and base stations setup uplink and downlink wireless channels, the mobile station transmitting a data flow setup in one of a plurality of modes, wherein:

the base station includes a means for interrupting the transmission via said downlink set up with said mobile station in a predetermined transmission interruption time interval;

the mobile station includes means for deciding, according to a data flow transmission mode, the packet transmission in a first transmission time interval for only the predetermined time interval as determined from the transmission interruption time interval;

the mobile station includes means for transmitting packets;

the base station includes means for transmitting an arrival confirmation signal for the received packet in the predetermined time interval; and the mobile station includes means for performing re-transmission in response to the arrival confirmation signal.

(20) A radio communication system, in which mobile and base stations setup uplink and downlink wireless channels, the mobile station transmits data flows, wherein:

the base station or a base station control unit connected the base station includes means for instructing the start or stop of a compression transmission method;

the base station includes means for interrupting, upon start of the compression transmission method, downlink transmission to the mobile station in the predetermined transmission interruption time interval;

the mobile station includes means for transmitting packets;

the base station includes means for transmitting an arrival confirmation signal for a packet transmitted by the base station after lapse of the predetermined time interval;

the mobile station includes means for performing re-transmission in response to the arrival confirmation signal;

the mobile station includes means for completing re-transmission of the packets in response to the number of the maximum re-transmission times notified by the base station or the base station control unit; and the base station or the base station control unit updates the number of the maximum re-transmission times in response to the start or stop of the compression communication method.

(21) A mobile station comprising:

means for setting up uplink and downlink wireless channels and transmitting a data flow;

means for determining packet transmission in a first transmission time interval for the predetermined time interval determined from a transmission interruption time interval in the base station in response to the transmission mode of the data flow;

means for transmitting packets in response to the determination; and means for performing re-transmission in response to an arrival confirmation signal for the packet received by the base station or to the determination.

(22) In a wireless communication system, in which mobile and base stations setup uplink and downlink wireless channels, the mobile station transmitting a data flow setup in one of a plurality of transmission modes, a base station used in the wireless communication system, in which:

the base station includes means for interrupting transmission via the downlink setup with the mobile station in the predetermined transmission interruption time interval;

the mobile station includes means for determining packets in a first transmission time preceding the transmission interruption time interval by the predetermined time interval;

the mobile station includes means for transmitting packets;

the base station includes means for transmitting an arrival confirmation signal for a packet received by the base station in the predetermined time interval;

the mobile station includes means for performing re-transmission in response to the arrival confirmation signal; and;

the base station includes means for interrupting the transmission of the arrival confirmation signal in the case when the transmission time interval of the arrival confirmation signal overlaps the transmission interruption time interval.

(23) A base station used in a wireless communication system, wherein:

mobile and base stations setup uplink and downlink wireless channels;

the mobile station includes means for transmitting a data flow setup in one of a plurality of transmission modes;

the base station includes means for interrupting transmission via the downlink setup with the mobile station in the predetermined transmission interruption time interval;

the mobile station includes means for determining, in response to the transmission mode of the data flow, packet transmission in a first transmission time interval for a predetermined period of time determined from the transmission interruption time interval;

the mobile station includes mans for transmitting packets;

the base station includes means for transmitting an arrival confirmation signal for the received packet in the predetermined time interval;

the mobile station includes means for performing re-transmission in response to the arrival confirmation signal; and the base station includes means for determining, for each data flow, a transmission mode for packet transmission in the first transmission time interval or re-transmission of the packets transmitted in the first transmission time interval.

(24) A base station control unit, in which;

mobile and base stations setup uplink and downlink wireless channels;

the mobile station includes means for transmitting a data flow setup in one of a plurality of transmission modes;

the base station includes means for interrupting transmission via the downlink setup with the mobile station in the predetermined transmission interruption time interval;

the mobile station includes means for determining, in response to the transmission mode of the dataflow, packet transmission in a first transmission time interval for the predetermined time interval determined from the transmission interruption time interval;

the mobile station includes means for transmitting packets;

the base station includes means for transmitting an arrival confirmation signal for the received pocket in the predetermined time interval; and the base station includes means for determining, for each data flow, a transmission mode of packet transmission in the first transmission time interval or re-transmission of the packets transmitted in the first transmission time interval.

(25) A base station control unit used in a wireless communication system, in which:

mobile and base stations setup uplink and downlink wireless channels, the mobile station including means for transmitting data flows;

the base station or a base station control unit connected the base station includes means for instructing the start or stop of a compression transmission method;

the base station includes means for interrupting transmission via the downlink to the mobile station in the predetermined transmission interruption time interval;

the mobile station includes means for transmitting packets;

the base station includes means for transmitting an arrival confirmation signal for the packet transmitted by the mobile station in the predetermined time interval;

the mobile station includes means for performing re-transmission in response to the arrival confirmation signal;

the mobile station includes means for completing re-transmission of the packets in response to the number of the maximum re-transmission times notified by the base station or the base station control unit; and the base station control unit includes means for updating the number of the maximum re-transmission times in response to the start or stop of the compression transmission method.

As described hereinabove, according to the present invention, in case when the ACK/NACK signal transmission timing overlaps a transmission gap (TG) in the compressed mode, the mobile station transmits only data flows of severe required delay swaying (i.e., data in a mode free from re-transmission control in the base station control unit or data scheduled by the base station control unit for transfer rate guarantee). Thus, data flows of severe required delay swaying can be transmitted at desired timings regardless of presence or absence of the TG, thus reducing the delay swaying. Besides, since no other data flow is transmitted, it is possible to evade re-transmission in the base station control unit due to ACK/NACK signal errors and reduce transmission delay. Also, the mobile station according to the present invention transmits packets free from the ACK/NACK signal transmission at a higher power level per bit than in the case of packets free from the ACK/NACK signal transmission. Thus, it is possible to reduce the error factor of such packets, prevent packet loss due to HARQ re-transmission incapability and improve the reception quality. Additionally, according to the present invention the base station does not transmit any ACK/NACK signal in case when the ACK/NACK signal overlaps the TG. As a result, the mobile station does not perform wasteful ACK/NACK signal transmission for packets free from the ACK/NACK signal reception, thereby reducing power consumption in the base station and also reducing the downlink interference power.

BRIEF DESCRIPTION OF DRAWINGS

In the accompanied drawings,
FIG. 2 is a chart to describe the transmission method in each transmission mode in the CM;
FIG. 10 is a chart for describing prior art.

DESCRIPTION OF PREFERRED EMBODIMENTS

Now, preferred embodiments of the present invention will be described by taking the aforementioned BUDQ of 3 GPP as an example.

First Embodiment

Figure 1:
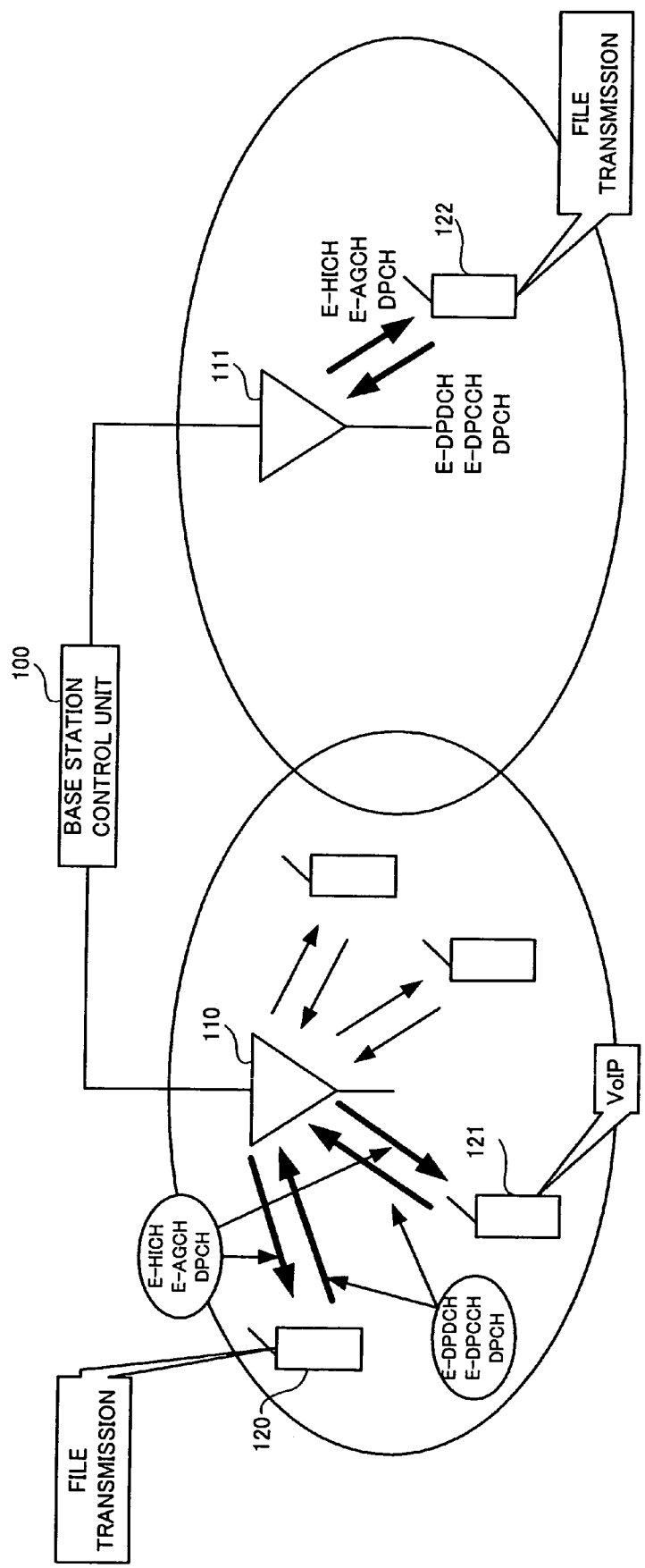
FIG. 1 shows a system arrangement to be used in the embodiments of the present invention.

FIG. 1 shows a system arrangement to be used in a first embodiment of the present invention.
Mobile stations 120 to 122 set up the following radio channel with base stations 110 and 111 for the EUDCH. The mobile station 121 transmits the VoIP of severe delay swaying requirement, and the mobile stations 120 and 122 execute a file transfer of severe error factor requirement.

E-DPDCM (UL): Channel for transmitting data of EUDCH
E-DPCCH (UL): Channel for transmitting control signal of EUDCH
E-HICH (DL): Channel for transmitting ACK/NACK signal of HARQ
E-ACCH (DL): Channel for transmitting scheduling signal
DPCH (DL/UL): Channel for transmitting other control signals It is assumed that the base station is connected to a plurality of mobile stations other than the mobile stations 120 and 121 and that the base station 110 is connected to a larger number of mobile stations as compared to the base station 111. The base stations 110 and 111 are connected to a base station control unit 100, which executes various controls concerning the wireless (or radio) channel setting-up between the base and mobile stations.

The uplink/downlink DPCHs contain TCP bits for controlling transmission power levels of mutual links. These channels are closed loop power level controlled in the base and mobile stations so as to provide the predetermined desired reception quality.

Figure 8:
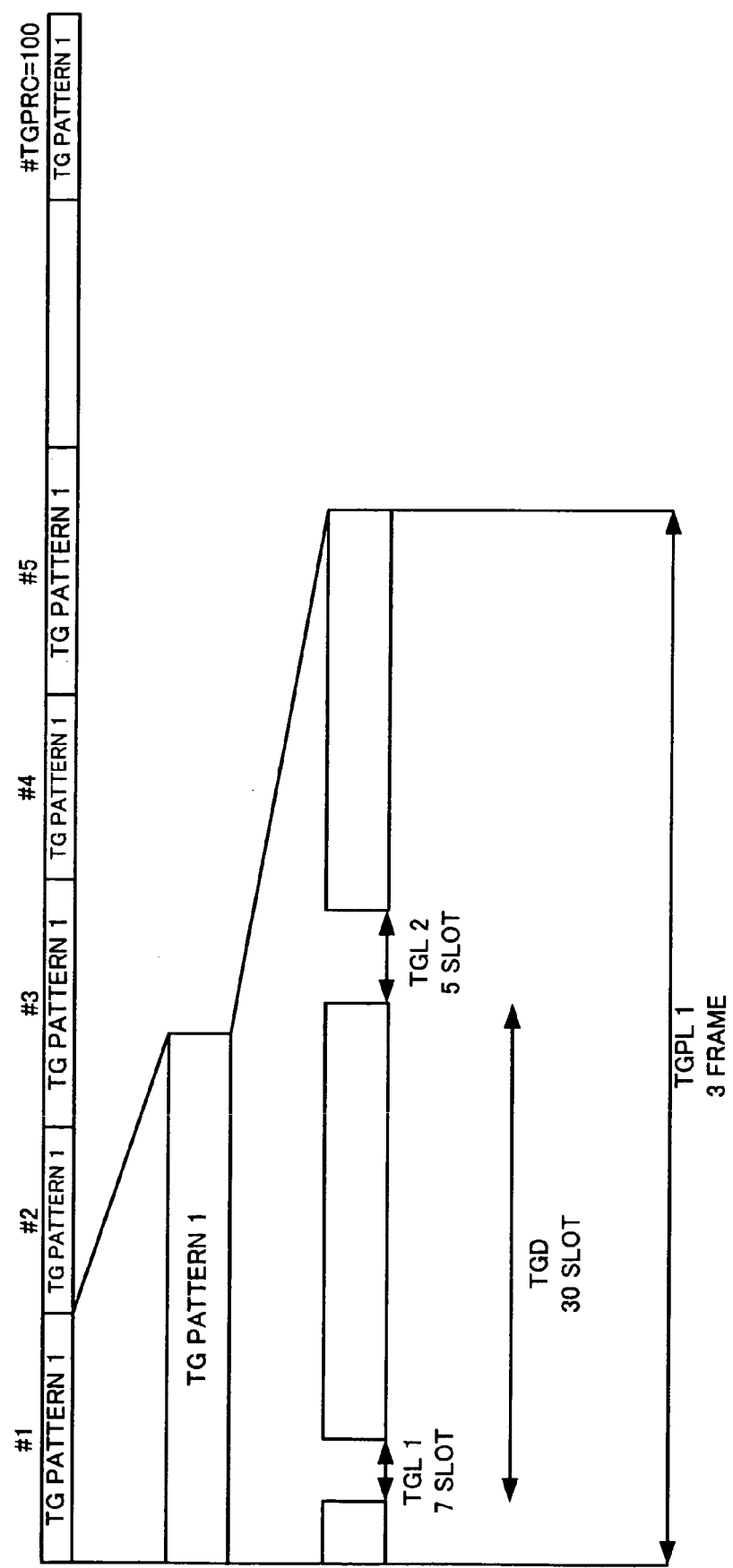
FIG. 8 is a chart for describing the parameters relating to the transmission interruption interval in the Compressed Mode.
Figure 9:
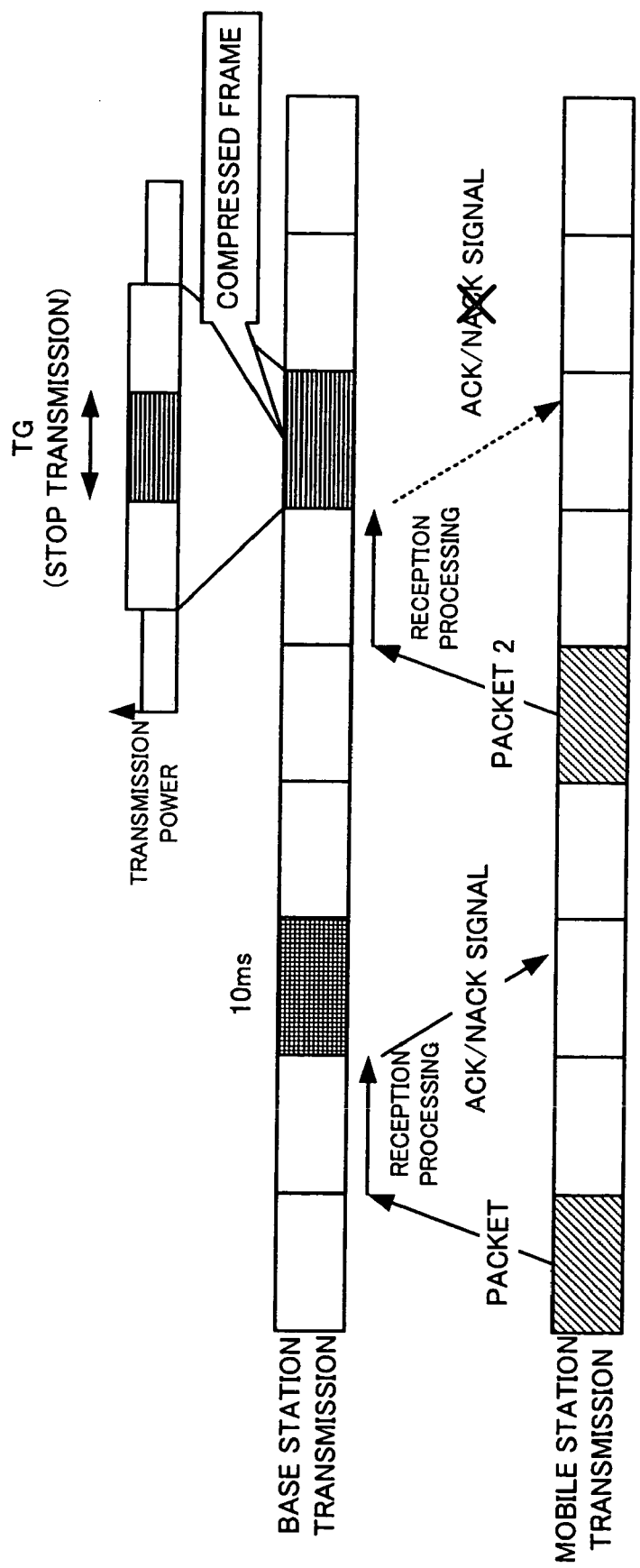
FIG. 9 is a chart for describing the relationship between the HARQ re-transmission control and the transmission interruption interval.

The mobile stations 120 to 122 are set to the compressed mode (CM), and the base station control unit 100 is notified the parameters concerning the TG as described hereinbefore in connection with FIG. 8 via the base station 111 for different frequency measurement.

The base stations schedule the mobile stations, and report the maximum allowable power level to the mobile stations by using the E-ACCH. Each mobile station is notified in advance of the setup of a transmission format (TF) prescribing the size of data block transmitted in the E-DPDCH and power off-set data, and calculates the required power for each TG from the block size and power offset data. The mobile station selects the TG permitting transmission at a power level lower than the informed maximum power level, and performs transmission in the E-DPDCH. The mobile station transmits a control signals concerning the scheduling and the HARQ in the E-DPCCH.

When each base station receives packets in the E-DPDCH, it performs packet error detection. If the base station does not detect any overlapping of the predetermined ACK/NACK signal transmission timing over the TG at all, it transmits the ACK/NACK signal in the E-HICH, and notifies if the packet reception is made correctly. The mobile station performs re-transmission according to the ACK/NACK signal. The mobile station continually performs re-transmission until the packet reception is made correctly or until the base station control unit reaches the preliminarily designated maximum number of re-transmission times. If the ACK.NACK signal transmission timing overlaps the TG even partly, the base station does not transmit any ACK/NACK signal.

The base station transmits the received E-UDCH data to the base station control unit, which accumulates the data in a buffer in a radio link controller (RLC) and detects packet loss from sequence numbers attached to the packets at the predetermined timing. If any packet loss is detected, one of two different modes are selected, i.e., an RLC re-transmission mode, in which re-transmission is requested to the mobile station and a no RLC re-transmission mode, in which re-transmission is not requested. In case of FIG. 1, the mobile stations 120 and 122 are performing file transfer and set up in the RLC re-transmission mode because of required high error factor of data flow. The mobile station 121, on the other hand, is set up in the no RLC re-transmission mode, because of required high delay swaying of data flow.

The base station control unit further decides the transmission mode at the CM time according to the RCL re-transmission mode or the connected mobile station number of the base station. The transmission mode at the CM time prescribes the operation of the mobile station regarding the packet transmission in case when the ACK/NACK signal overlaps the TG even partly. The transmission mode is one of three modes, i.e., an "interrupt mode", a "repeat mode" and a "skip mode". If the ACK/NACK overlaps the TG, the mobile station operates as follows.

"Interrupt mode": Data is transmitted at a higher power level per bit than that in the normal level and the transmission of the pertinent packet is completed (see FIG. 2(a)).

"Repeat mode": Data is transmitted at the normal power level, and re-transmission is performed without fail (see FIG. 2(b)).

"Skip mode": No data is transmitted at this timing (see FIG. 2(c)).

In case of data flow with high value of delay swaying requirement, i.e., data flow from the mobile station 21, the base station control unit is set to the "interrupt mode". This is done so to transmit packets irrespective of the TG for reducing the delay swaying. Since data is generated periodically at a short interval (of 20 ms) in the VoIP, if it is set to the "repeat mode" to perform re-transmission without fail, re-transmitted packets are increased so as to interrupt transmission of new packets. On the other hand, in the "interrupt mode" in which no data is re-transmitted, new packets can be transmitted at all times. Thus, data can be transmitted as soon as it is generated, thereby reducing the delay swaying and improving the service quality.

On the other hand, either the "repeat mode" or the "skip mode" is set for the data flow of severe error factor requirement. The "repeat mode" is set for the data flow from the mobile station 122. In the "repeat mode" in which packets at timings incapable of transmitting the ACK/NACK signal are re-transmitted at all times, it is possible to reduce the packet loss in the base station. Thus, it is possible to reduce the probability of occurrence of a large delay due to the RLC re-transmission and reduce the file transfer delay. The "skip mode" is set for the data from the mobile station 120 for reducing wasteful interference quantity of the uplink because the number of mobile stations connected to the pertinent base station is more than the predetermined number. Wasteful interference may occur in the "repeat mode", in which packets in the timing incapable of transmitting the ACK/MNACK signal are re-transmitted without fail. In the "skip mode", in the case of overlapping of the ACK/NACK signal over the TG to disable transmission, packet transmission is interrupted in advance and permitted in the next TTI. Thus, it is possible to reduce wasteful uplink interference.

Figure 3:
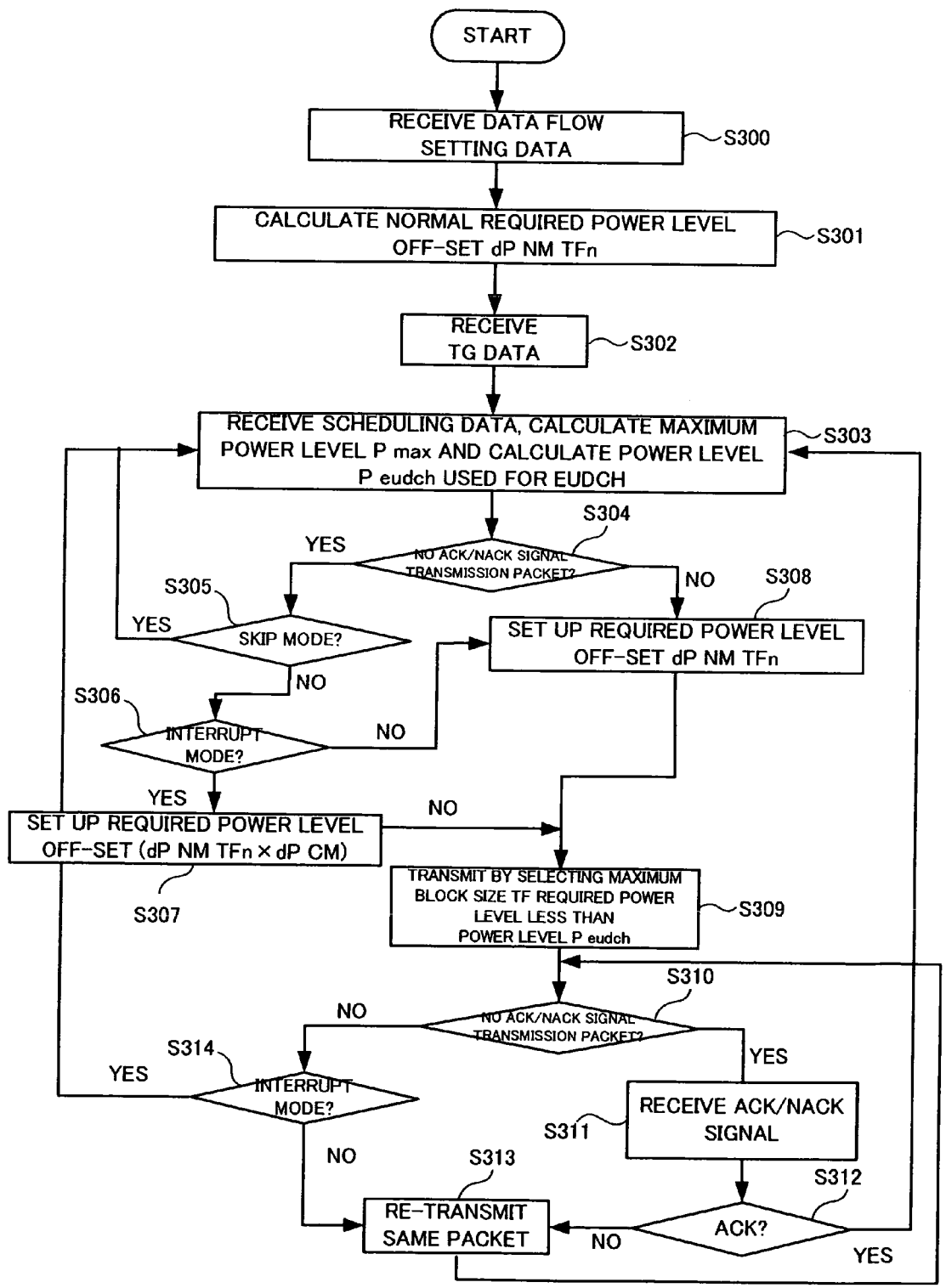
FIG. 3 is a flowchart to show the operation of the mobile station to be used in the embodiment of the present invention.

Now, the operation of the mobile station according to the present invention will be described with reference to FIG. 3.

When it starts communication using the EUDCH, the mobile station first receives from the base station control unit by way of the base station a TF set (TF0, TF1, TF2, TF3), a reference power level, a QoS power level offset $dP\_QoS$ and the transmission mode at the CM time as the data flow setting information. If the CM time transmission mode is the "interrupt mode" at this time, the mobile station also receives the $dP\_CM$ data as the CM time transmission offset (step S300). The reference power level $dP\_ref$ represents reference power level offset of known block size $D\_ref$ (bits). The reference power level offset of the TFn (n being 0 to 3), of which the block size is $D\_TYFn$ (bits), is calculated as $$dP\_TFn=(D\_TFn/D\_ref)*dP\_ref.$$

The term "power level offset" is meant a value representing the multiple of the DPCCH power level with reference to the E-DPDCH power level. The mobile station calculates the normal required power level offset $dP\_NM\_TFn=dP\_TFn \times dP\_QoS$ (n being 0 to 3) by multiplying the reference power level offset by $dP\_QoS$, which is set according to the QoS of the data flow, and holds the calculated value until the data flow setup data is re-setup by the base station control unit (step S301). If the CM is set, the mobile station receives the TG information (step S302).

Subsequently, the mobile station receives scheduling data in the predetermined cycle, calculates the power level P_eudch (mW), calculates the maximum power level P_max (mW) allowed to be used as informed in the scheduling data, and decides power level P_eudch (mW), which is the difference of the power level P_dpch (mW) for DPCH communication from the P_max (mW), to be power level allowed to be uses for the EUDCH data (step S303). The mobile station then makes a check from the TG data if the ACK/NACK signal concerning packets to be transmitted in the next TTI overlaps the TG (step S304). If the mobile station detects overlap, it determines the pertinent packet to be no ACK/NACK signal transmission packet. In this case, the mobile station makes a check if the CM time transmission mode is the "skip mode" (step S305). If "YES" yields in the step S305, the mobile station transmits no packet in this TTI.

The mobile station then makes a check if the CM time transmission mode is the "interrupt mode" (step S306). If "YES" yields in the step S306, the mobile station sets up the required power level offset $dP'\_TFn$ to be ($P\_NM\_TFn+P\_CM$) (step S307).

In the other case, i.e., in the case of ACK/NACK signal transmission packet or in the "repeat" mode, the mobile station sets up the required power level offset $dP'\_TFn$ to be $P\_NM\_TFn$ (step S308). Then, the mobile station calculates, from the power level offset $dP'\_TFn$ and the power level $P\_dpcch$ of DPCCH, each TF required power level of EUDCH to be ($P\_dpcch \times dP'\_TFn$) (mW) for data transmission by selecting the maximum block size TF among TFs, of which the required power level is less than the power level P_eudch allowed to be used for the EUDCH (step S309). Then, the mobile station makes a check again if the pertinent packet is no ACK/NACK signal transmission packet (step S310). In case of the no ACK/NACK signal transmission packet, the mobile station receives the ACK/NACK signal (step S311). Then, the mobile station makes a check if the received signal is the ACK signal (step S12). In case of the ACK signal, the mobile station completes transmission of the pertinent packet. In case of the NACK signal, the mobile station re-transmits the same packet at the predetermined re-transmission timing (step S313).

In case of the no ACK/NACK signal transmission packet and also the "interrupt mode" (i.e., when step S314 yields "YES"), the mobile station completes transmission of the pertinent packet. In case of the "repeat mode" (i.e., when the step S314 yields "NO", the mobile station re-transmits the same packet at the predetermined re-transmission timing (step S313).

As described herein above, the mobile station according to the present invention can change the transmission operation for packets in which the ACK/NACK signal transmission timing overlaps the TG in accordance with the data flow. In case of the data flow, of which severe delay swaying is required, and in which data is periodically generated at a short time interval, the mobile station can be set to the "interrupt mode" so that it transmits data as soon as the data is generated irrespective of the TG. In this way, the mobile station can continuously transmit new packets without re-transmission thereof at all times. It is thus possible to reduce the delay swaying and improve the reception quality of service.

In case of the data flow, for which error factor requirement is more strict than delay swaying requirement and the RLC re-transmission mode is set, the mobile station can be set in the "repeat mode" so that it can perform re-transmission at all times. Thus, even if correct reception is not made in the base station, re-transmission is performed, thereby reducing the RLC re-transmission probability and data transmission delay and improving the thorough-put.

In a complicated case when mobile stations more than the predetermined number are connected to the base station, the mobile station can be set in the "skip mode" instead of the "repeat mode". Thus, at the timing when no ACK/NACK signal can be transmitted, the mobile station transmits no packets, and does transmission when and only when the base station transmits the NACK signal. It is therefore possible to reduce wasteful re-transmission and also uplink interference.

Figure 4:
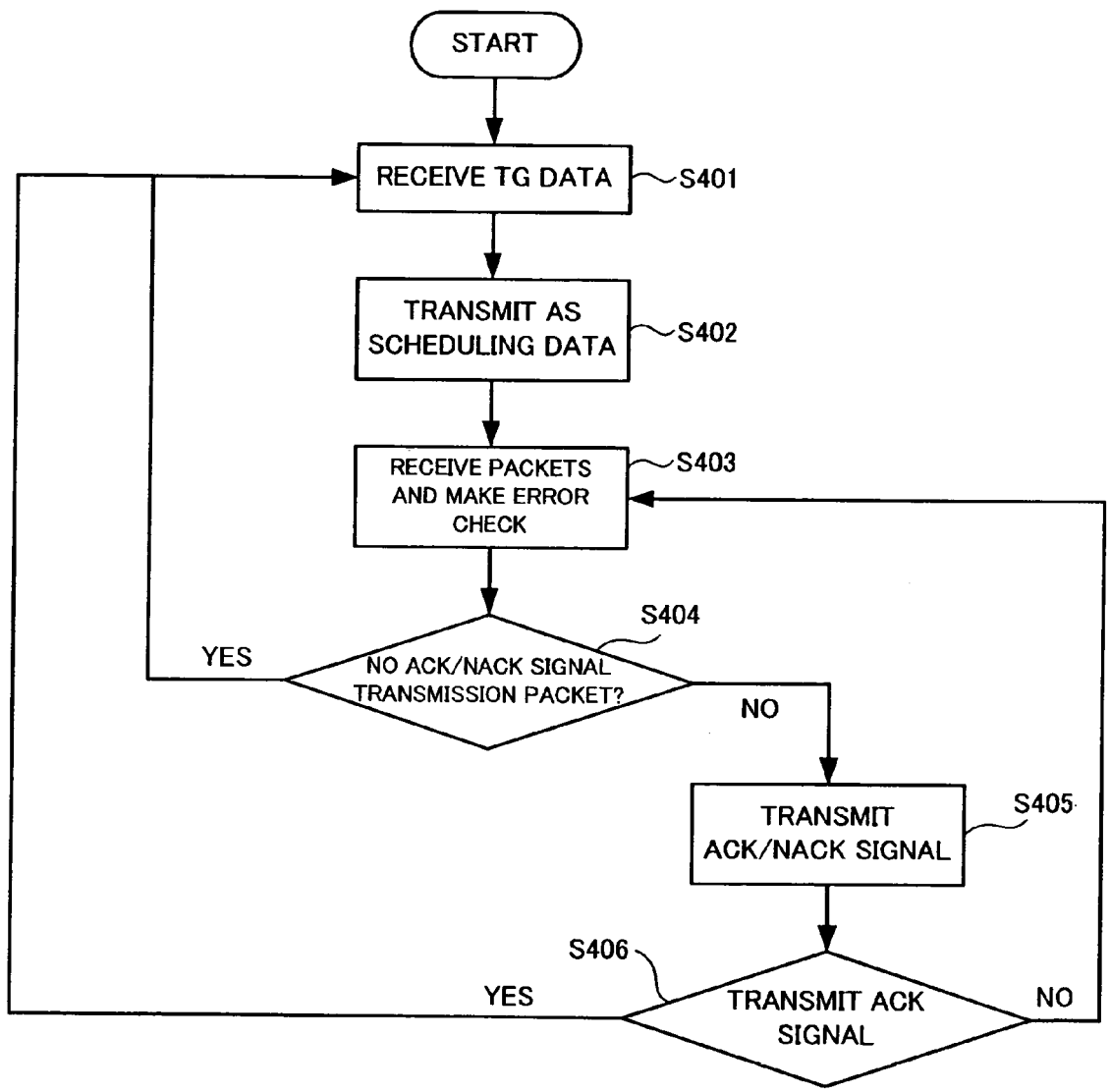
FIG. 4 is a flowchart to show the operation of the base station to be used in the embodiment of the present invention.

Now, the operation of the base station according to the present invention will be described with reference to FIG. 4.

When the base station is set in the CM, it receives the TG data from the base station control unit (step S401). When communication using the EUDCH is started, the base station performs scheduling by taking the data quantity and so forth in each mobile station into consideration, and determines the maximum power level permitted to be used in the mobile station and transmits it as the scheduling data (step S402). When receiving packets from the mobile station, the base station performs an error check (step S403). Then, after a predetermined time interval, the base station checks if the ACK/NACK signal transmission timing overlaps the TG (step S404). If the base station detects the overlap ("YES" in step S404), it determines the pertinent packet to be no ACK/NACK signal transmission packet, and does not transmit the ACK/BACK signal for this packet. In the other case (i.e., "NO" in step S404), the base station transmits the ACK/NACK signal according to the result of the error check (step S405). Then, the base station checks if the ACK or NACK signal is transmitted (step 406). If the NACK signal is transmitted, the base station receives re-transmitted packets after the predetermined time interval. If the ACK signal is transmitted, and also if it determines that the pertinent packet is a no ACK/NACK signal transmission packet, the base station transmits scheduling data and waits for receiving a new packet.

As appreciated from the above description, in case of overlapping of the ACK/NACK signal over the TG, the base station according to the present invention does not transmit the ACK/NACK signal. That is, with respect to a packet, which the mobile station determines to be no ACK/NACK signal transmission packet, and for which the mobile station does no re-transmission, the base station does not transmit wasteful ACK/NACK signal, thereby reducing power consumption in the base station and also wasteful interference power level on the downlink.

Figure 5:
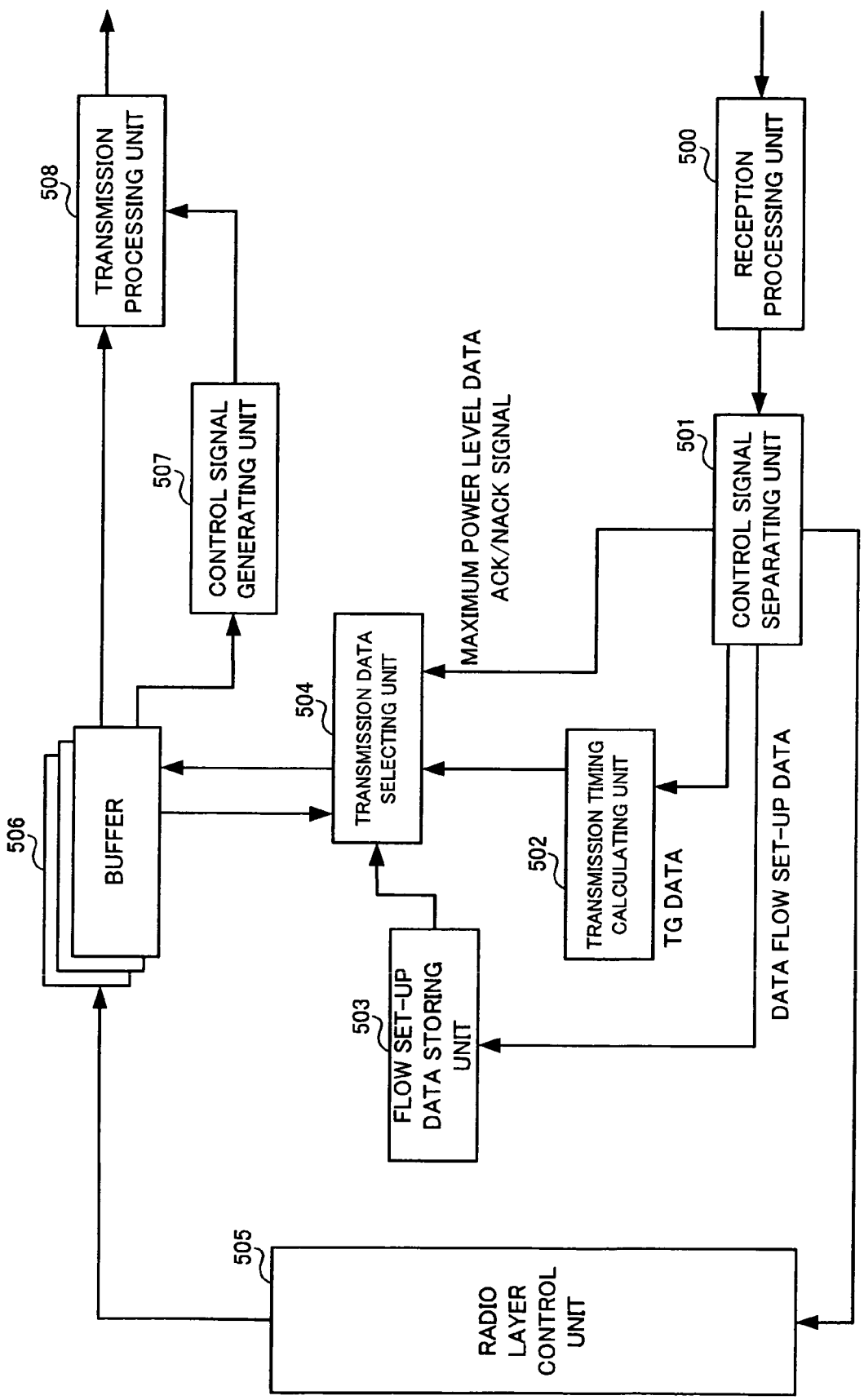
FIG. 5 is a block diagram to show the construction of the mobile terminal to be used in the embodiment of the present invention.

FIG. 5 is a block diagram to show the arrangement of the mobile station.

The mobile station comprises a reception processing unit 500 for executing reception processing such as inverse diffusion and decoding of the received signal, a control signal separating unit 501 for separating control signals, a transmission timing calculating unit 502, a flow set-up data storing unit 503, a transmission data selecting unit 504, a radio layer control unit 505 for processing the received radio layer data, a buffer 506 for accumulating transmission data, a control signal generating unit 507 for generating such signals as scheduling signals to be transmitted via the uplink, and a transmission processing unit 508 for executing transmission processing such as coding and dispersion.

The control signal separating unit 501 feeds data flow set-up data that are notified in advance via the DPCH before the EUDCH starts to the flow set-up data storing unit 503, and also feeds the TC data that is transmitted via the DPCH before the CM starts to the transmission timing calculating unit 502. Furthermore, upon starting the EUDCH, the unit 501 separates the ACK/NACK signal that is transmitted via the E-HICH and E-AGCH and the scheduling signal (i.e., maximum power level data), and feeds the separated signals to the transmission data selecting unit 504. If the ACK/NACK signal is the ACK signal, the unit 501 decides that the transmission data is stored in the buffer 506 and that the packet for re-transmission is to be transmitted.

On the other hand, if the ACK/NACK signal is the ACK signal, the transmission timing checking unit 502 checks if the transmission timing of the ACK/NACK signal for the packet of transmission in the pertinent TTI overlaps the TG. If it detects the overlapping, the unit 502 informs to the transmission data selecting unit 504 that the pertinent packet is no ACK/NACK signal transmission packet. The transmission data selecting unit 504 calculates the power level P_eudch permitted to be used in the E-DPDCH from the maximum power level that is indicated in the scheduling signal, and selects, with reference to the required power level of the TF stored in the flow set-up data storing unit 503, the TF having the maximum block size permitted to be transmitted at the P_eudch or below. At this time, the required power level of each TF is calculated in the procedure as described hereinbefore in connection with the base station operation flow in FIG. 4, and stored in the flow set-up data storing unit 503.

The transmission data selecting unit 504 notifies the selected TF data to the buffer 506. According to the notified TF, the buffer 506 feeds the data block to the transmission processing unit 508. The transmission processing unit 508 transmits the E-DPDCH at the required power level of the TF stored in the flow set-up data storing unit 503, and transmits the control signal for the E-DPDCH, i.e., the data for the TF and the number of re-transmission times via the E-DPCCH.

Figure 6:
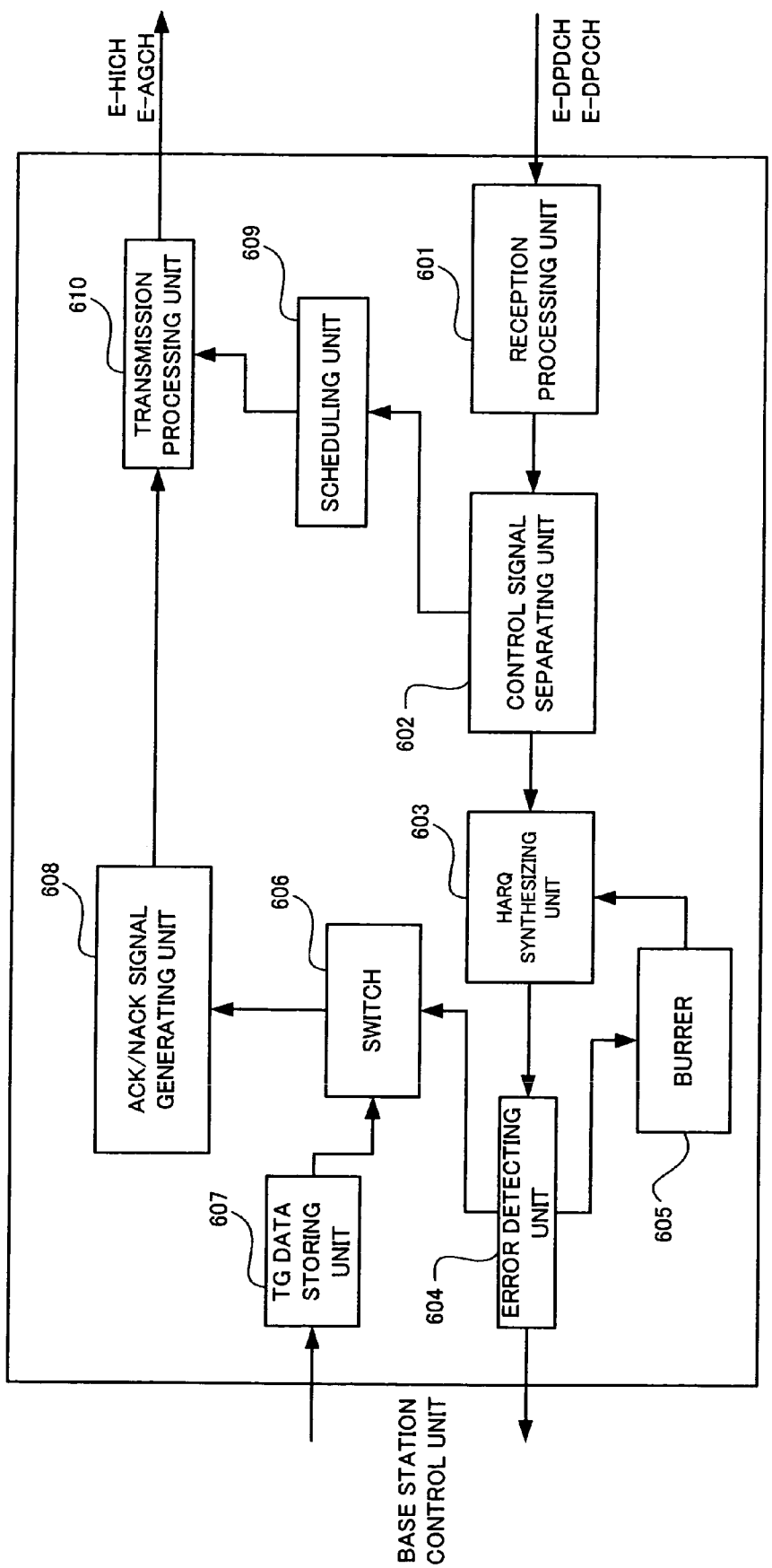
FIG. 6 is a block diagram to show the construction of the base station to be used in the embodiment of the present invention.

FIG. 6 is a block diagram to show the arrangement of the base station according to the present invention.

The base station according to the present invention comprises a reception processing unit 601 for executing reception processing such as inverse diffusion and decoding of the received signal, a control signal separating unit 602 for separating the control signals and data, an HARQ synthesizing unit 603, an error detecting unit 604 for the received packets, a buffer 605 for accumulating the received data, a switch 606, a TG data storing unit 607, an ACK/NACK signal generating unit 608, a scheduling unit 609 for scheduling the EUDCH user, and a transmission processing unit 610 for executing transmission processing such as coding and diffusion.

The HARQ synthesizing unit 603 combines the received data stored in the buffer 605 for re-transmitting packets, decodes the synthesized data, and notifies the ACK/NACK signal generating unit 608 about any error detected by the error detecting unit 604. At this time, the TG data storing unit 607 checks if the pertinent ACK/NACK signal transmission timing overlaps the TG. If the unit 607 detects overlapping, it turns off the switch to interrupt transmission of the ACK/NACK signal. In the other case, the ACK/NACK signal generating unit 608 generates the ACK/NACK signal for feeding it to the transmission processing unit 610.

The scheduling unit 609 performs scheduling on the basis of accumulated mobile station buffer data quantity contained in scheduling data and transfer rate change, and feeds the power level data to be assigned to each mobile station to the transmission processing unit 610.

Figure 7:
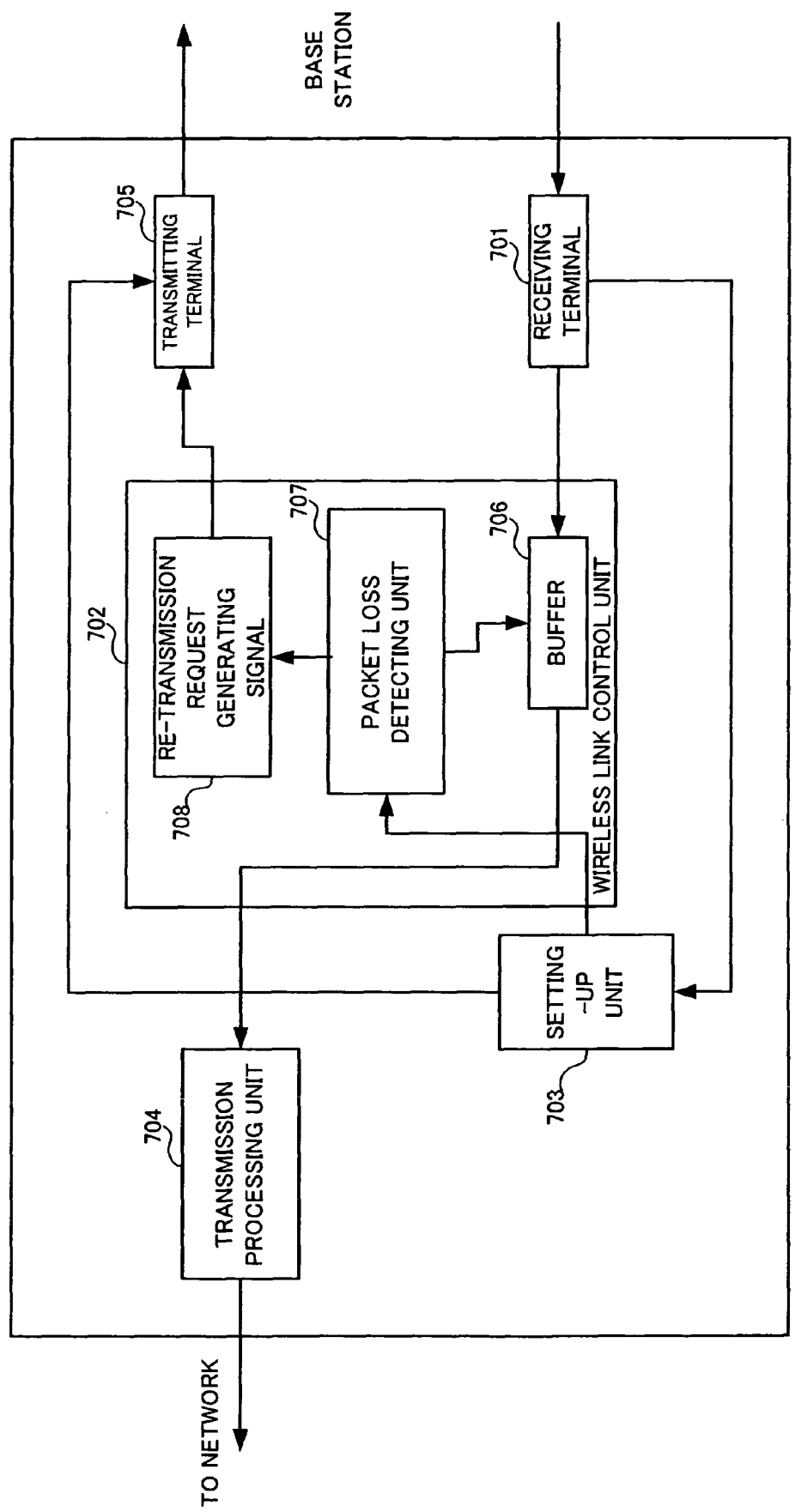
FIG. 7 is a block diagram to show the construction of the base station control unit to be used in the embodiment of the present invention.

FIG. 7 is a block diagram to show the arrangement of the base station control unit according to the present invention.

The base station control unit comprises a receiving terminal 701 for receiving data from base stations, a wireless link control unit 702, a setting-up unit 703 for deciding the set-up data of each data flow and the TG data of the CM, a transfer processing unit 704 for sending out data processed in the base station control unit to the network, and a transmitting terminal 705 for transmitting data to base stations.

The setting-up unit 703 decides the re-transmission mode and the CM time transmission mode from the service of each data flow. In case of the streaming service with severe delay swaying requirement, the unit sets up a no RLC re-transmission mode, and in the CM time transmission mode it sets up the "interrupt mode".

Furthermore, in case of the service such as file and data transmission as the data flow in which the error rate must be set to extremely low, the setting-up unit 703 sets to the RLC re-transmission mode. In case of the base station, in which mobile stations connected thereto are more than the predetermined threshold number, the unit sets up the CM time transmission mode to the "skip mode". If the connected mobile stations are not more than the threshold number, the unit sets up the CM time transmission mode to the "repeat mode".

The wireless link control unit 702 receives data packets from the receiving terminal 701, accumulates the packets in the buffer 706 for individual users, and feeds the packets to the transfer processing unit 704 by confirming sequence numbers attached in the predetermined cycle to the packets in its packet loss detecting unit 707. At this time, depending on the re-transmission mode of the data flow as determined by the setting-up unit 703, the unit performs different operations as follows:

If the wireless link control unit 702 detects abnormality while checking no RLC re-transmission mode sequence numbers, i.e., if it detects any packet of a sequence number earlier than the sequence numbers of packets that are fed to the transfer processing unit 704, it discards such packet.

If the wireless link control unit 702 detects any missing packet while checking RLC re-transmission mode sequence numbers, it informs the missing to its re-transmission request signal generating unit 708. Then, the unit 708 generates a re-transmission request signal with respect to the mobile station, and feeds the signal to the transmitting terminal 705.

The transmitting terminal 705 transmits the data flow set-up data such as the re-transmission mode, the CM time transmission mode, the maximum re-transmission times number that is determined in the setting-up unit 703, the TG data in the CM, the control signal that is fed from the re-transmission request signal generating unit 708 and the like to the base and mobile stations.

It is to be noted in this embodiment that the setting-up unit 703 sets up the "interrupt mode" for all severe delay request data flows. However, this is by no means limitative, and the base station control unit may decide the "interrupt mode" or other modes depending on the TG density or frequency in the CM. Specifically, the unit may set up the "interrupt mode" in case when the TG occurrence is above the predetermined threshold frequency, for instance, when the TG occupies 10 ms or longer in 40 ms, and set up the "repeat mode" in case when the threshold is not surpassed. This is so because by setting up the "repeat mode" in case of a low TG occurrence frequency, the probability of interference with new data transmission is low with low frequency of occurrence of re-transmission packets due to overlap of the ACK/NACK signal over the TG. In such case, it is possible not to set to the "interrupt mode", but to set to the "repeat mode" also for data flows with severe delay swaying requirement so that they can be re-transmitted.

Second Embodiment

Now, a second embodiment of the present invention will be described. The second embodiment is configured, other than the scheduling to be performed by the base station in the first embodiment, the base station control unit secures resources in priority so as to provide the setting for transmission rate guarantee data flows. Such data flows are referred to as the transmission rate guarantee data herein. The base station control unit sets data flows of severe delay swaying requirement to be transmission rate guarantee data. When the mobile station transmits such data flows, it is notified in advance from the base station control unit of the fact that the data flow has been set up to be transmission rate guarantee data. It is prescribed that the mobile station can transmit such data flows at any time at the predetermined transmission rate notified from the base station control unit irrespective of the power level instructed by the base station.

In the second embodiment, unlike the first embodiment, no CM time transmission mode is notified. Instead, the mobile station decides, depending on whether the data flow is the transmission rate guarantee data, the operation concerning packet transmission at such timing that the ACK/NACK signal overlaps the TG.

In case of the transmission rate guarantee data, the mobile station transmits the data at a power level which is the product of the previously notified CM time additional power level offset dP_CM and the normal power level offset, and completes the packet transmission. That is, the mobile station performs operation as in the case of the "interrupt mode" in the first embodiment.

In case other than the transmission rate guarantee data, the mobile station calculates the required power level of each TF with the normal power level offset, calculates, from the maximum power level notified from the base station, a power level permitted to be used for the E-DPDCH, and transmits data of maximum block size TF at a required power level lower than the power level permitted to be used for the E-DPDCH. Then, the mobile station re-transmits the same data block at the predetermined re-transmission timing. That is, the mobile station performs operation as in the case of the "repeat mode" in the first embodiment.

As appreciated from the above description in connection with the first embodiment, the second embodiment permits packet transmission irrespective of the TG in case of data flows with severe delay swaying requirement. Also, since packets disabling the ACK/NACK signal reception are not re-transmitted, no wasteful re-transmission is made, and new packets can be transmitted as soon as they are generated. Moreover, since packets disabling the ACK/NACK signal transmission are transmitted at a higher per bit power level than in the case of the other packets, it is possible to reduce the packet reception error factor, and the packet loss factor can be held low due to no packet re-transmission. Thus, it is possible to reduce delay swaying and improve the service quality. As for the other data flows, the packets disabling the ACK/NACK signal reception are re-transmitted. It is therefore possible to reduce the re-transmission probability in the base station control unit, thereby reducing the packet transmission delay and improving the thorough-put.

Although the second embodiment is arranged to execute the operation in the "repeat mode" of the first embodiment in the case other than the transmission rate guarantee data, it is also possible to arrange so that the operation corresponding to the "skip mode" of the first embodiment is executed.

Third Embodiment

Now, a third embodiment of the present invention will be described. In the third embodiment, in case of overlapping of the ACK/NACK signal transmission timing over the TG, the mobile station transmits data flows as in the normal manner, and performs re-transmission at the predetermined timing. This means that the mobile station always operates like the case in the "repeat mode" of the first embodiment. The base station control unit in the third embodiment is set apart from that of the first embodiment in that, in case of setting up the mobile station in the CM for transmitting of severe delay swaying requirement, the mobile station is instructed to re-setup the number of the maximum re-transmission times and the power level offset as follows:

Maximum number of re-transmission times: 0
Power level offset: dP_QoS(New)=dP_QoS(OLD)×dP_CM.

The re-setup mobile station thus performs transmission at the per bit power level always set to higher than before the CM setting, and does not perform any re-transmission. When the base station control unit is interrupted the setting-up of the mobile station in the CM, it instructs the mobile station to re-setup the number of the maximum re-transmission times and the power level offset to the initial values.

In this embodiment, when the mobile station transmitting a data flows with severe delay requirement is set up in the CM, the maximum re-transmission times number is set to zero, i.e., it is set so that no re-transmission is performed at all time. Instead, the per bit power level is set to be higher than before the CM setting-up for transmission. Thus, no re-transmission packet occurs even in the case of disability of transmission due to overlapping of the ACK/NACK signal over the TG. That is, new data can be transmitted as soon as it is generated. It is therefore possible to reduce delay swaying of streaming service, in which data occurs in the predetermined short cycle, and improve the service quality. Also, since the per bit transmission power level is set to be higher than before the CM setting-up during this time, it is possible to reduce the error factor in the base station and hold a low packet loss probability due to no re-transmission.

Fourth Embodiment

A fourth embodiment is the same as the first embodiment except that the wireless link control unit and the setting up unit as provided in the base station control unit are provided in the base station.

Fifth Embodiment

A fifth embodiment is the same as the second embodiment except that the wireless link control unit and the setting up unit as provided in the base station control unit are provided in the base station.

Sixth Embodiment

A sixth embodiment is the same as the third embodiment except that the wireless link control unit and the setting-up unit as provided in the base station control unit are provided in the base station.

What is claimed is:

1. A communication control method in a wireless communication system, in which a mobile station and a base station setup uplink and downlink channels between the mobile station and the base station, wherein the mobile station transmits a data flow setup in one of a plurality of transmission modes, the communication control method, comprising:

determining, by the base station or a base station control unit to which the base station is connected, a transmission mode, among the plurality of the transmission modes, of the data flow and notifying the determined transmission mode to the mobile station by the base station or the base station control unit;

interrupting transmission by the base station via the downlink channel with the mobile station for a predetermined transmission interruption time;

determining in the mobile station, in a first transmission time interval, whether to transmit a packet by the mobile station based on the transmission mode of the data flow, wherein the mobile station determines whether packet transmission time by the mobile station in the first transmission time interval is at a time earlier by a predetermined time than the predetermined transmission interruption time, wherein the first transmission time interval is a packet transmission time interval, and an expected transmission time of an arrival confirmation signal transmitted from the base station, in response to any packet transmitted in the packet transmission time interval based on the transmission mode, partly or fully overlaps the predetermined transmission interruption time;

transmitting the packet by the mobile station in response to the determining;

transmitting by the base station the arrival confirmation signal corresponding to the packet; and determining whether to perform a re-transmission by the mobile station in response to the arrival confirmation signal based on the transmission mode of the data flow, wherein the mobile station determines the transmission mode for a data flow in transmission according to a ratio of the predetermined transmission interruption time to a predetermined time interval in the mobile station, wherein the transmission mode is determined to be the interrupt mode if the ratio of the predetermined transmission interruption time to the predetermined time interval is greater than a predetermined value.

2. A communication control method of claim 1, wherein the transmitting the packet by the mobile station in response to the determining comprises:

transmitting the packet in the first transmission time interval by the mobile station if the transmission mode of the data flow is an interrupt mode; and interrupting the packet transmission by the base station in the first transmission time interval if the transmission mode for the data flow is a skip mode.

3. A communication control method of claim 1, wherein the transmitting the packet by the mobile station in response to the determining comprises::

terminating the packet transmission by the mobile station after transmitting the packet in the first transmission time interval if the transmission mode for the data flow is an interrupt mode; and performing re-transmission of the packet at a re-transmission time, wherein the re-transmission time occurs after the predetermined time from an end of the predetermined transmission interruption time, if the transmission mode for the data flow is a repeat mode.

4. A communication control method of any one of claims 2 or 3, wherein when the mobile station transmits an interrupt mode data flow in the first transmission time interval, such a power level is set for transmitting the packet in the first transmission time interval that the set power level per bit is higher than power levels used during transmission in other transmission time intervals.

5. The communication control method of claim 1, wherein packet arrival confirmation is selectively made for each data flow by the base station control unit, and a data flow for performing re-transmission in the base station control unit is determined to be in the repeat mode or the skip mode.

6. A communication control method of claim 1, wherein the mobile terminal determines the transmission mode for a data flow in transmission according to a ratio of the predetermined transmission interruption time to a predetermined time interval in the mobile station.

7. A communication control method of claim 6, wherein the transmission mode is determined to be the interrupt mode if the ratio of the transmission interruption time to the predetermined time interval is greater than a predetermined value.

8. The communication control method of claim 1, which is applied to a wireless communication system capable of setting, as the transmission mode, a transmission rate guarantee mode with uplink resources preferentially assigned by the base station or the base station control unit connected thereto, wherein the transmitting the packet by the mobile station in response to the determining comprises:

transmitting packets in the first transmission time interval by the mobile station in case of data flow in the transmission rate guarantee mode; and interrupting the packet transmission by the mobile station in case of any data flow other than the transmission rate guarantee mode.

9. The communication control method of claim 1, which is applied to a radio communication system capable of setting up a data flow in a transmission rate guarantee mode, wherein uplink resources are preferentially assigned by said base station or the base station control unit connected thereto, and the radio communication system is capable of setting up a data flow in a transmission rate non-guarantee mode with resources assigned among the remaining uplink resources by said base station, wherein the transmitting the packet by the mobile station in response to the determining comprises:

terminating the packet transmission by the mobile station after transmitting the packet in the first transmission time interval when the data flow is in the transmission rate guarantee mode, and performing re-transmission of the packet by the mobile station in a re-transmission time, wherein the re-transmission time occurs after the predetermined time from an end of the predetermined transmission interruption time when the data flow is in the transmission rate non-guarantee mode.

10. A communication control method of claim 8 or 9, wherein in the case when the mobile station transmits a data flow in the transmission rate guarantee mode in the first transmission time interval, the mobile station performs transmission at such a power level for transmitting the packet in the first transmission time interval that the power level per bit is higher than power levels used during transmission in other transmission time intervals.

11. A wireless communication system comprising:

a mobile station; and a base station connected to the mobile station via uplink and downlink wireless channels, wherein the mobile station transmits a data flow to the base station, the data flow setup in one of a plurality of transmission modes, wherein the base station includes:

means for determining a transmission mode, among the plurality of the transmission modes, of the data flow, means for notifying the determined transmission mode to the mobile station by the base station or a base station control unit to which the base station is connected, and means for interrupting transmission via said downlink channel set up with said mobile station in a predetermined transmission interruption time;

wherein the mobile station includes:

means for deciding, according to a data flow transmission mode, whether to transmit a packet in a first transmission time interval based on the transmission mode of the data flow, wherein the means for deciding decides whether packet transmission time by the mobile station in the first transmission time interval is at a time earlier by a predetermined time than the predetermined transmission interruption time, wherein the first transmission time interval is a packet transmission time interval, and an expected transmission time of an arrival confirmation signal transmitted from the base station, in response to any packet transmitted in the packet transmission time interval based on the transmission mode, partly or fully overlaps the predetermined transmission interruption time, and means for transmitting the packet in response to a decision by the means for deciding;

wherein the base station further includes means for transmitting the arrival confirmation signal for the packet; and the mobile station includes means for performing re-transmission in response to the arrival confirmation signal, wherein the mobile station determines the transmission mode for a data flow in transmission according to a ratio of the predetermined transmission interruption time to a predetermined time interval in the mobile station, wherein the transmission mode is determined to be the interrupt mode if the ratio of the predetermined transmission interruption time to the predetermined time interval is greater than a predetermined value.

12. A mobile station comprising:

means for setting up uplink and downlink wireless channels with a base station and transmitting a data flow to the base station;

means for receiving, from the base station or a base station control unit to which the base station is connected, a transmission mode of the data flow among a plurality of transmission modes;

means for determining whether to transmit a packet in a first transmission time interval based on a transmission interruption time in the base station in response to a transmission mode of the data flow, wherein the means for determining determines whether packet transmission time by the mobile station in the first transmission time interval is at a time earlier by a predetermined time than the transmission interruption time, wherein the first transmission time interval is a packet transmission time interval, and an expected transmission time of an arrival confirmation signal transmitted from the base station, in response to any packet transmitted in the packet transmission time interval based on the transmission mode, partly or fully overlaps the predetermined transmission interruption time;

means for transmitting a packet in response to the determination by the means for determining; and means for performing re-transmission in response to the arrival confirmation signal for the packet received by the base station or in response to the determination, wherein the mobile station determines the transmission mode for a data flow in transmission according to a ratio of the transmission interruption time to a predetermined time interval in the mobile station, wherein the transmission mode is determined to be the interrupt mode if the ratio of the transmission interruption time to the predetermined time interval is greater than a predetermined value.

13. A wireless communication system comprising:
a mobile station; and
a base station connected to the mobile station via uplink and downlink wireless channels, wherein the mobile station transmits data flows to the base station in one of a plurality of transmission modes,
wherein the base station includes:
    means for determining a transmission mode, among the plurality of the transmission modes, of the data flow,
    means for notifying the determined transmission mode to the mobile station by the base station or a base station control unit to which the base station is connected, and
    means for interrupting transmission via the downlink setup with the mobile station in a predetermined transmission interruption time,
wherein the mobile station includes:
    means for determining whether to transmit a packet in a first transmission time interval, wherein the means for determining determines whether packet transmission time by the mobile station is at a time which precedes the predetermined transmission interruption time by a predetermined time, wherein the first transmission time interval is a packet transmission time interval, and an expected transmission time of an arrival confirmation signal transmitted from the base station, in response to any packet transmitted in the packet transmission time interval based on the transmission mode, partly or fully overlaps the predetermined transmission interruption time, and
    means for transmitting the packet in response to a determination by the means for determining;
wherein the base station includes means for transmitting the arrival confirmation signal for the packet received by the base station;
the mobile station includes means for performing re-transmission in response to receiving the arrival confirmation signal; and
the base station includes means for interrupting the transmission of the arrival confirmation signal when the transmission time of the arrival confirmation signal overlaps the predetermined transmission interruption time,
wherein the mobile station determines the transmission mode for a data flow in transmission according to a ratio of the predetermined transmission interruption time to a predetermined time interval in the mobile station,
wherein the transmission mode is determined to be the interrupt mode if the ratio of the predetermined transmission interruption time to the predetermined time interval is greater than a predetermined value.

* * * * *